No. 669,822. Patented Mar. 12, 1901.
T. B. DOOLEY.
MOTOR VEHICLE.
(Application filed Nov. 5, 1900.)

(No Model.) 3 Sheets—Sheet 1.

Witnesses:
Nathan C. Lombard 2nd
Francis H. Shepherd

Inventor:
Thomas B. Dooley,
by Lombard & Whitney
Attys.

THE NORRIS PETERS CO., PHOTO-LITHO., WASHINGTON, D. C.

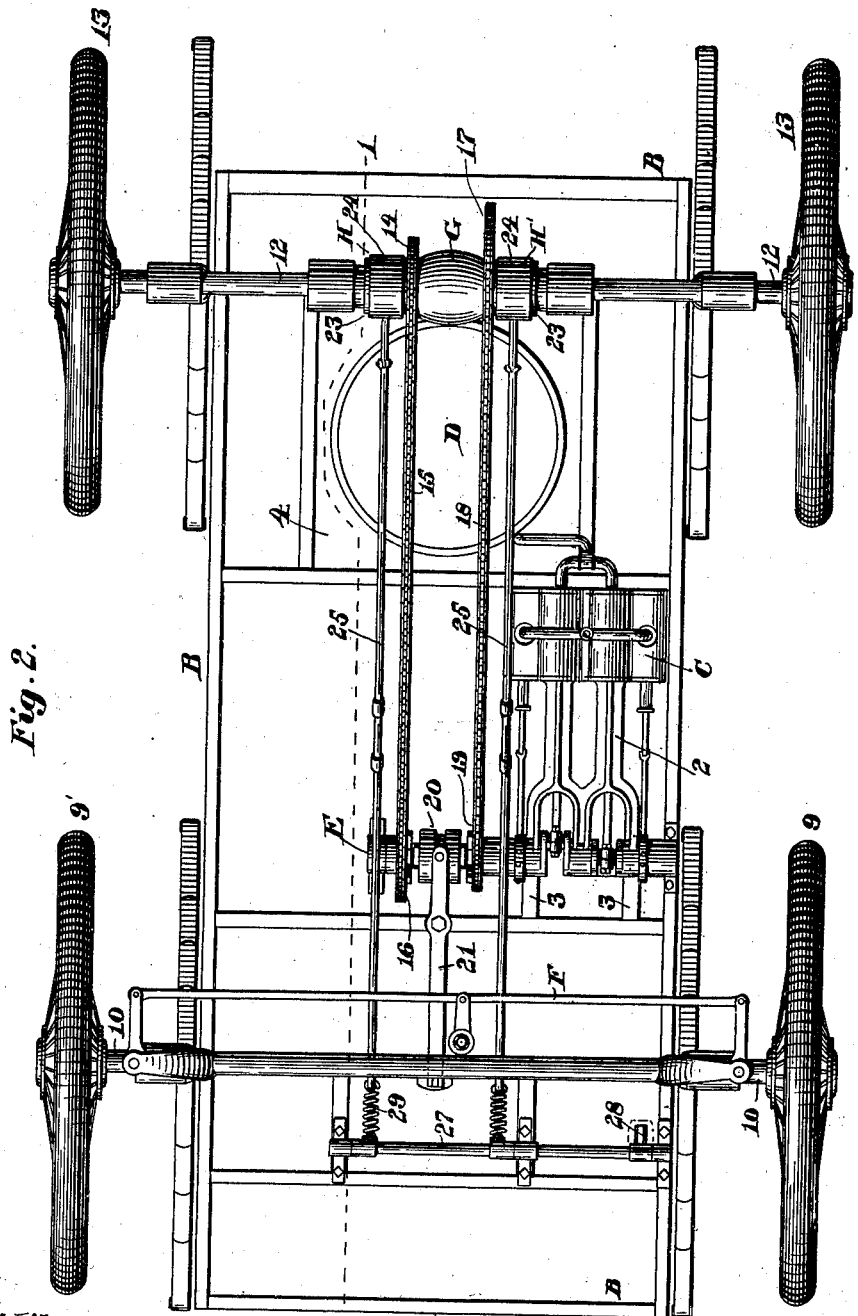

No. 669,822.

T. B. DOOLEY.
MOTOR VEHICLE.
(Application filed Nov. 5, 1900.)

Patented Mar. 12, 1901.

(No Model.)

3 Sheets—Sheet 3.

Witnesses:
Nathan C. Lombard 2nd
Francis H. Shepherd

Inventor:
Thomas B. Dooley.
by Lombard & Whitney
Attys.

UNITED STATES PATENT OFFICE.

THOMAS B. DOOLEY, OF MALDEN, MASSACHUSETTS, ASSIGNOR TO EVERETT D. WIGGIN, TRUSTEE, OF BOSTON, MASSACHUSETTS.

MOTOR-VEHICLE.

SPECIFICATION forming part of Letters Patent No. 669,822, dated March 12, 1901.

Application filed November 5, 1900. Serial No. 35,494. (No model.)

*To all whom it may concern:*

Be it known that I, THOMAS B. DOOLEY, a citizen of the United States of America, and a resident of Malden, Middlesex county, Massachusetts, have invented certain new and useful Improvements in Motor-Vehicles, of which the following is a specification.

This invention relates to motor-vehicles of that class in which the traction axle or shaft has a sprocket-wheel secured thereto and is driven by a sprocket-chain extending over said sprocket-wheel and over another sprocket-wheel on the driving or motor shaft mounted in bearings on the body of the vehicle.

The objects of the invention are to furnish a motor-vehicle of improved construction and organization in which the motor is practically detached from and is supported considerably in advance of its source of supply and at one side of the longitudinal central line of the vehicle, and in which the motor-shaft is located considerably in advance of the transverse central line of the body and in parallelism with the traction-axle, whereby to secure the greatest distance between the two shafts and cause the pulling strain of the chain to be distributed the entire length of the motor; further, to provide, in connection with the traction-axle of the motor-vehicle, one at each side the equational box or equalizer, two sprocket-wheels of relatively different pitch diameters and to connect the larger sprocket-wheel with a smaller sprocket-wheel on the motor-shaft and the smaller sprocket-wheel with a larger sprocket-wheel on said shaft by means of two independent sprocket-chains, and also to provide two concurrently operative brake devices, one adjacent the outer face of the small sprocket-wheel of the traction-shaft and the other adjacent the large sprocket-wheel of the traction-shaft and each of which is operatively connected to the usual foot-lever-actuated rocking shaft.

With these objects in view the invention consists in certain details of construction and in the combination and arrangement of the several parts of the motor-vehicle, substantially as hereinafter described, and more particularly pointed out in the claims.

Figure 1:
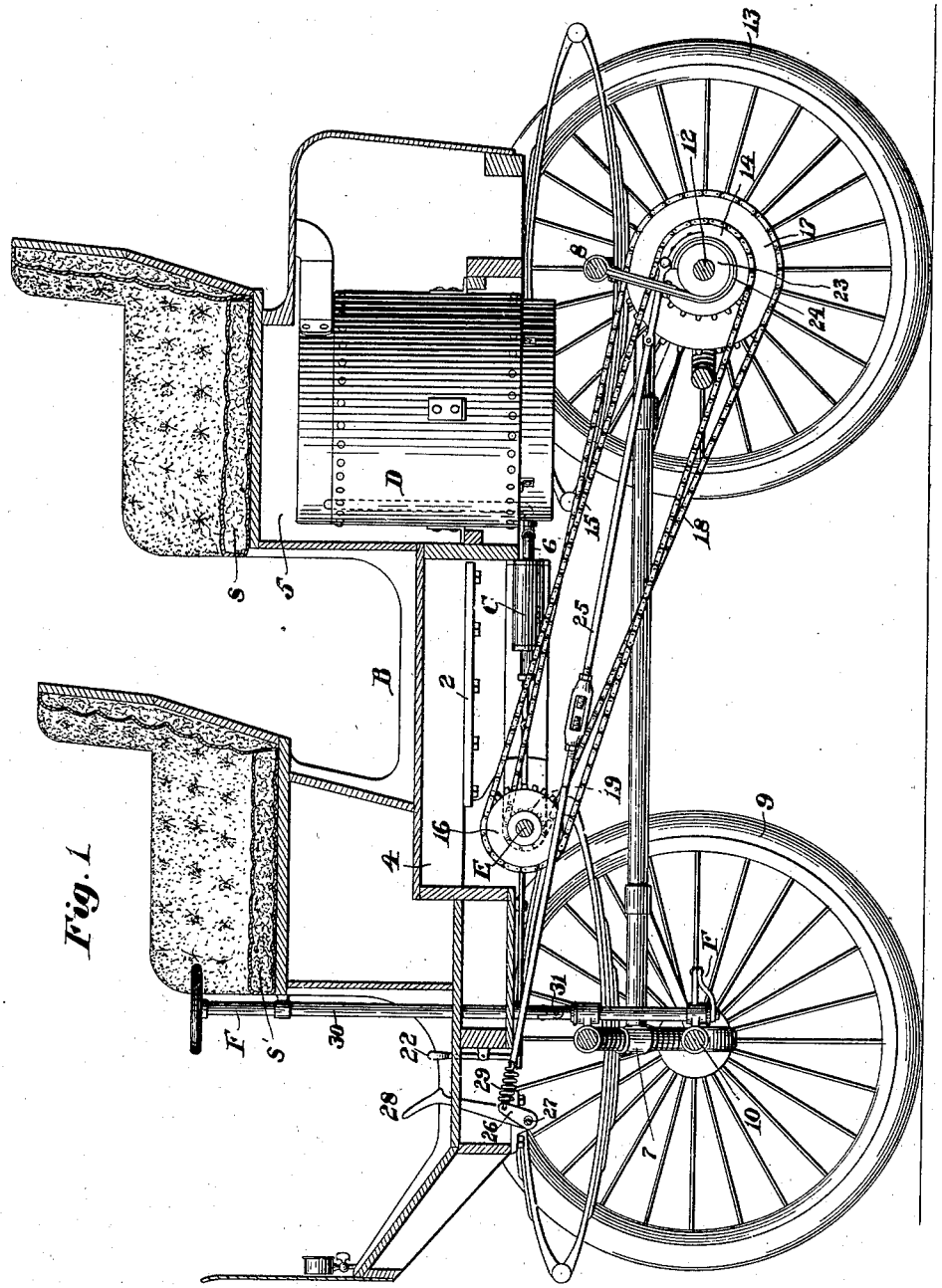
Figure 4:
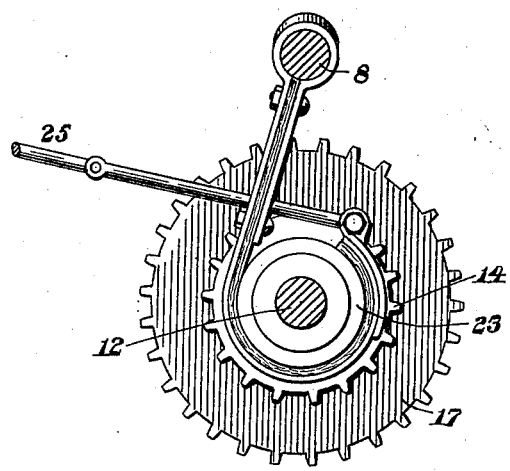
Figure 3:
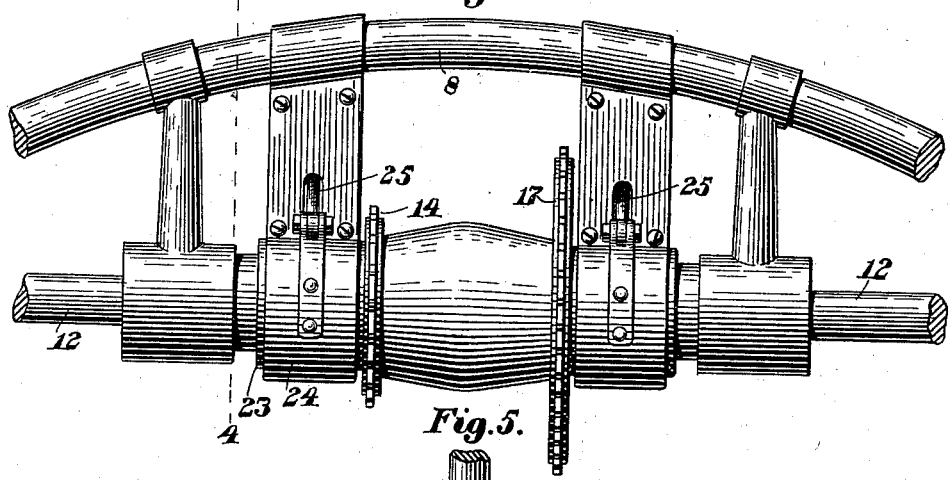

In the drawings accompanying and forming part of this specification, Figure 1 is a vertical longitudinal section of a motor-vehicle embodying my present improvements, the section being taken on a line corresponding with the dotted line 1 1 in Fig. 2 and looking in the direction of the arrow. Fig. 2 is an under side view of the vehicle. Fig. 3 is an end view, on a relatively large scale, of a portion of the running-gear, showing the traction-shaft, sprocket-wheels thereon, the equalizer between the sprocket-wheels, and the two brake devices; and Fig. 4 is a cross-section taken on the dotted line 4 4 in Fig. 3 and showing the parts at the right of said line.

Similar characters represent like parts in all the figures of the drawings.

Inasmuch as the present invention more particularly resides in the special construction and organization of those elements which directly control the movements of the traction-shaft and in the adaptation of these elements to and in their combinations with the vehicle-body and running-gear, it is not deemed necessary herein to enter into a detail description of all the elementary features of the vehicle, some of which are and many of which may be of any usual well-known construction and organization. To this end it is desired to state that the vehicle-body (designated in a general way by B) may be of any suitable general construction adapted for supporting the motor, its supply apparatus, and other driving instrumentalities.

In the construction and organization thereof shown most clearly in Figs. 1 and 2 of the drawings the prime actuator or motive agent for the vehicle comprises a reciprocatory steam-engine, (designated by C,) which engine is shown inverted and has its bed-plate 2 bolted to the under side of beams 3, constituting a part of the body of the vehicle. This engine is disposed with its cylinders in a horizontal plane and substantially midway between the front and rear ends of the vehicles. For the purpose of supporting the engine in such manner that the same will not extend much below the floor-line of the body said body has an elevated stepped portion between the ends thereof, forming an engine-receiving compartment 4 of sufficient height to practically incase said engine, the front wall of this compartment being located considerably in advance of the transverse central line of the vehicle-body. At the rear end of the vehicle-body is formed another compartment 5, in which is supported the boiler D, this compartment being shown located under the rear seat s and extending rearwardly somewhat beyond said seat. The boiler D, which may be of any suitable construction and which may embody any suitable fire-box or heating device, is supported in the chamber 5, somewhat in the rear of the engine C, a suitable induction-pipe 6 leading from said boiler to the steam-chest (not shown) of the engine. By this construction it will be seen that the bed has two independent compartments or chambers, one located in the rear of the other and that the engine and boiler are practically disconnected—that is, disconnected in the sense that the engine does not have its bed-plate secured to the boiler after the usual method—and it will also be seen that the engine is disposed substantially midway the length of the body and at one side the longitudinal central line (not indicated) of the body, so that all vibratory motion due to the operation of the engine will be so equally disseminated throughout the entire surface area of the body as to become practically *nil*, in so far as jarring effect is concerned, thus obviating the disagreeable wabbling and annoying vibrations experienced with many motor-vehicles of usual construction, due to the inequality and distribution of vibratory forces. Furthermore, by locating the engine in a horizontal plane substantially midway the length of the vehicle-body I am enabled to locate the motor-shaft (which is designated by E) in a horizontal plane parallel to the axis of the traction-shaft and considerably in advance of the transverse central line (not indicated) of the body.

The body may be supported in any suitable manner, it being shown supported upon springs suspended from the arched axle-carriers or shaft-carriers 7 and 8 in the well-known manner.

The front or steering wheels 9 and 9' are supported on the front axle 10, which has suitable steering mechanism (indicated at F) connected therewith in the usual manner.

The traction-shaft 12, upon which the traction-wheels 13 and 13' are fixed, may be of the well-known transversely-divided construction, the two members of which are connected by compensating gearing or what may be termed an "equational box" or "equalizer." (Shown in elevation in Figs. 2 and 3 and indicated by G.) The construction and organization of the equalizer and the connection of its gears to the traction-shaft sections being well known, it is deemed unnecessary to illustrate the same in detail.

The motor-shaft E is shown as a crank-shaft supported in suitable bearings on the framework.

As a simple and convenient means for rotating the traction-shaft at different speeds arbitrarily from the motor-shaft E a small sprocket-wheel 14 is shown fixed to one section of the shaft at one end of the equalizer G and is connected by means of a sprocket-chain 15 to a larger sprocket-wheel 16, loosely mounted upon the motor-shaft, and a large sprocket-wheel 17 is shown fixed to the other section of said traction-shaft at the other end of the equalizer and is connected by a sprocket-chain 18 to a smaller sprocket-wheel 19, also loosely mounted upon said motor-shaft, and in splined connection with the motor-shaft is a clutch member 20, disposed between the hubs of the two sprocket-wheels 16 and 19 and adapted for clutching said sprocket-wheels to said shaft independently and arbitrarily.

Any suitable clutch device may be employed between the two sprocket-wheels 16 and 19 of the motor-shaft, and a detail illustration of the construction and organization thereof is deemed unnecessary.

The clutch member 20 will be operated, by means of the clutch-shifter 21, through a clutch-shifter actuator 22, (shown as a foot-lever,) in convenient position to be operated by any one on the front seat s' of the vehicle.

By supporting the motor-shaft considerably in advance of the engine C and extending sprocket-chains from the sprocket-wheels 16 and 19 thereon over the sprocket-wheels 14 and 17, respectively, on the traction-shaft it will be seen that the entire pulling strain of the chains is substantially in the line of the cylinders of the engine and extends the entire length of said engine. Further, it will be seen that a longer chain may be used than would be possible if the engine were connected directly with the boiler, thus obviating any appreciable slack being produced in the chain by the depression of the body of the vehicle and securing the best possible driving connection between the motor and traction-shaft.

In practice the driven sprocket-wheels 14 and 17 on the traction-shaft will be located at opposite sides, respectively, of the center of said shaft and at equal distances from said center.

In connection with the two sections of the traction-shaft I have provided two concurrently-operative brake devices, (designated in a general way by H and H', respectively,) each of which consists of a brake-wheel 23, (see Fig. 4,) a flexible brake-band 24, connected at one end to the arched shaft-carrier 8, and a brake-rod 25, connected at its opposite ends to a crank 26 on the usual rock-shaft 27, journaled in bearings on the framework, and which rock-shaft is provided with the usual foot-lever 28, whereby the same may be operated.

Figure 5:
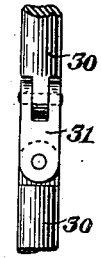

In the construction and organization shown most clearly in Figs. 4 and 5 of the drawings one brake device, as H, is located contiguous to the outer face of the smaller sprocket-wheel 14 and the other brake device, as H', is located contiguous to the outer face of the large sprocket-wheel 17, and the brake-rods of these devices are disposed in parallelism with and at equal distances from the longitudinal central line of the body, so that in operating the brakes the strain will be equally distributed each side the longitudinal central line of the vehicle. Between the cranks 26 and the ends of the rods 25 are interposed springs 29, which tend to permit an equalizing of the brake-pressure when the foot-lever 28 is operated.

The rod 30 of the steering mechanism F is made in two sections connected by a universal joint 31, while the upper section has a sliding fit in the bearing 32, the whole to permit of the free movement of the body upon the frame without affecting the operation of the steering mechanism, all in an obvious manner.

I claim—

1. In a motor-vehicle, the combination with the running-gear including a traction-shaft, of a body mounted on said running-gear and having two independent compartments disposed, one in advance of the other; a boiler supported in the rear compartment; an engine supported in the forward compartment; a motor-shaft disposed in advance of said engine; and sprocket mechanism connecting the motor-shaft and traction-shaft.

2. In a motor-vehicle, the combination with the running-gear including a traction-shaft, of a body mounted on said running-gear and having two independent compartments disposed one in advance of the other; a boiler supported in the rear compartment; a reciprocating engine supported in the front compartment and having its working stroke parallel to the path of travel of the vehicle and having a steam connection with the boiler; a motor-shaft driven by said engine; two sprocket-wheels of relatively different pitch diameters loosely mounted on the motor-shaft; means for clutching said wheels to said shaft independently; two sprocket-wheels of relatively different diameters fixed to the traction-shaft; and two sprocket-chains connecting the larger sprocket of the traction-shaft to the smaller wheel of the motor-shaft and connecting the smaller sprocket-wheel of the traction-shaft to the larger wheel of the motor-shaft.

3. In a motor-vehicle, the combination with the running-gear embodying a traction-shaft, and with the body mounted on said running-gear, of a boiler supported on the body; a reciprocatory engine supported on the body in advance of said boiler; a motor-shaft driven by said engine; two sprocket-wheels of different diameters mounted on said shaft; two sprocket-wheels of different diameters fixed to the traction-shaft and the larger one of which is connected by a chain to the smaller sprocket-wheel on the motor-shaft, and the smaller of which is connected by a chain to the larger wheel on the motor-shaft; two independent brake devices in connection with the traction-shaft and one of which is contiguous to the outer face of one sprocket-wheel and the other of which is contiguous to the outer face of the other sprocket-wheel; and a common actuator for said two brake devices.

4. In a motor-vehicle the combination with the traction-shaft embodying an equalizer, and with driving mechanism for said shaft, of two concurrently-operative brake devices in operative connection with the traction-shaft one at each side the equalizer; a foot-lever-actuated rock-shaft; and two brake-rods operatively connecting the rock-shaft and brake devices.

5. In a motor-vehicle the combination, with the body and with the body-supporting running-gear including a traction-shaft of a horizontally-disposed motor supported on the body substantially midway its length and at one side the longitudinal central line thereof; a motor-shaft disposed in advance of the motor; and two independently-operative sprocket chain and wheel driving devices connecting the motor-shaft and traction-shaft; and a clutch for controlling the operations of the two driving devices.

Signed by me at Boston, Massachusetts, this 23d day of October, 1900.

THOMAS B. DOOLEY.

Witnesses:
 WALTER E. LOMBARD,
 NATHAN C. LOMBARD, 2d.